United States Patent
Mizohana et al.

(10) Patent No.: US 11,443,410 B2
(45) Date of Patent: Sep. 13, 2022

(54) IMAGE PROCESSING METHOD AND IMAGE PROCESSING APPARATUS

(71) Applicant: CANON KABUSHIKI KAISHA, Tokyo (JP)

(72) Inventors: Hiroto Mizohana, Tokyo (JP); Keita Dan, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 17/061,845

(22) Filed: Oct. 2, 2020

(65) Prior Publication Data

US 2021/0110513 A1    Apr. 15, 2021

(30) Foreign Application Priority Data

Oct. 10, 2019   (JP)   .............................. JP2019-187167

(51) Int. Cl.
*G06T 3/40*    (2006.01)
*G06V 10/75*   (2022.01)

(52) U.S. Cl.
CPC .......... *G06T 3/4069* (2013.01); *G06T 3/4076* (2013.01); *G06V 10/751* (2022.01)

(58) Field of Classification Search
CPC ................. G06T 3/4069; G06T 3/4076; G06T 2207/10012; G06T 7/593; G06V 10/751
See application file for complete search history.

(56) References Cited

U.S. PATENT DOCUMENTS

| | | | |
|---|---|---|---|
| 9,659,379 B2 | 5/2017 | Sekiguchi et al. | |
| 10,104,359 B2 | 10/2018 | Saitoh et al. | |
| 2015/0235103 A1* | 8/2015 | Komatsu | G06T 7/593 |
| | | | 382/195 |
| 2015/0248594 A1* | 9/2015 | Zhong | G06T 7/593 |
| | | | 382/195 |
| 2015/0302596 A1 | 10/2015 | Mizukami et al. | |
| 2016/0098841 A1 | 4/2016 | Sekiguchi et al. | |
| 2016/0301912 A1 | 10/2016 | Saitoh et al. | |
| 2019/0012798 A1* | 1/2019 | Amano | B60W 30/08 |
| 2019/0213746 A1 | 7/2019 | Azuma et al. | |

FOREIGN PATENT DOCUMENTS

| | | |
|---|---|---|
| JP | 2014-096062 A | 5/2014 |
| JP | 2015-143677 A | 8/2015 |
| JP | 2016-075658 A | 5/2016 |
| JP | 2019-120591 A | 7/2019 |

\* cited by examiner

*Primary Examiner* — Chan S Park
*Assistant Examiner* — Daniel C Chang
(74) *Attorney, Agent, or Firm* — Venable LLP

(57) ABSTRACT

An image processing method includes a matching cost calculating process of calculating matching costs in a unit of sub-pixels having higher resolution than first and second images by using an image of a reference area contained in the first image in which a target object is imaged and images of a plurality of comparison areas contained in the second image in which the target object is imaged, and a synthesized cost calculating process of calculating synthesized costs related to the reference area based on comparison results of values related to the plurality of matching costs calculated in the matching cost calculating process.

11 Claims, 13 Drawing Sheets

FIG.1A
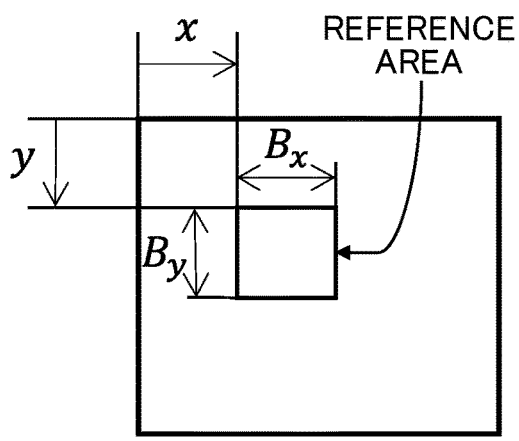
FIG.1B
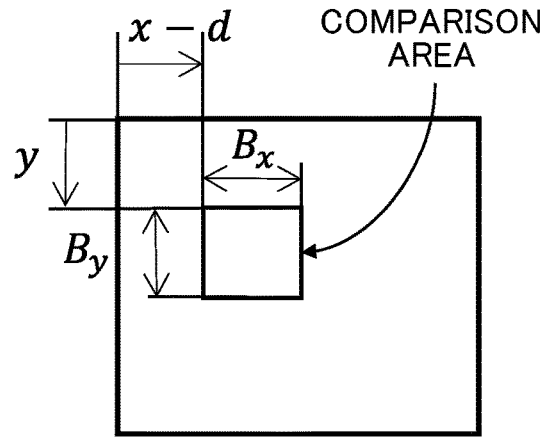
FIG.1C
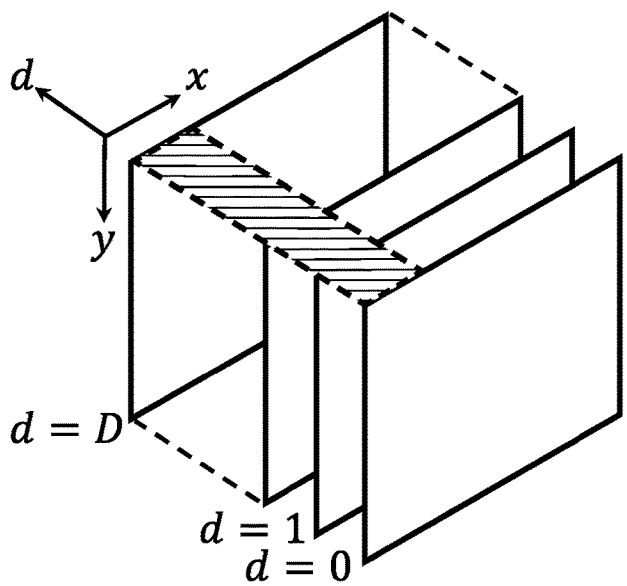
FIG.1D
$C(x, y, d)$ $(y = 0, D = 4)$
| d \ x | 0 | 1 | 2 | 3 | 4 |
|---|---|---|---|---|---|
| 0 | 20 | 40 | 60 | 80 | 50 |
| 1 | 10 | 20 | 30 | 50 | 50 |
| 2 | 60 | 80 | 40 | 10 | 60 |
| 3 | 80 | 50 | 50 | 50 | 40 |
| 4 | 20 | 50 | 20 | 80 | 10 |

$C_{gt}(p,d)$

| d \ x | 0 | 1 | 2 | 3 | 4 |
|---|---|---|---|---|---|
| 0 | 20 | 40 | 50 | 80 | 90 |
| 1 | 10 | 20 | 30 | 50 | 90 |
| 2 | 60 | 80 | 60 | 10 | 60 |
| 3 | 80 | 50 | 50 | 50 | 40 |
| 4 | 20 | 50 | 50 | 80 | 10 |
| 5 | 20 | 60 | 50 | 80 | 40 |

FIG.3A $C(p,d)$

| d \ x | 0 | 1 | 2 | 3 | 4 |
|---|---|---|---|---|---|
| 0 | 20 | 40 | 50 | 80 | 90 |
| 1 | 10 | 20 | 30 | 50 | 90 |
| 2 | 60 | 80 | 60 | 10 | 60 |
| 3 | 80 | 50 | 30 | 50 | 40 |
| 4 | 20 | 50 | 20 | 80 | 10 |
| 5 | 20 | 60 | 30 | 80 | 40 |

FIG.3C

| x | 0 | 1 | 2 | 3 | 4 |
|---|---|---|---|---|---|
| $d_{gt}$ | 0.67 | 0.75 | 0.9 | 2.0 | 4.0 |

FIG.3B

| x | 0 | 1 | 2 | 3 | 4 |
|---|---|---|---|---|---|
| $d_s$ | 0.67 | 0.75 | 4.0 | 2.0 | 4.0 |
| $d_s - d_{gt}$ | 0.0 | 0.0 | 3.1 | 0.0 | 0.0 |

FIG.3D $L_r(p,d)\ (r=(1,0), P1=20, P2=40)$

| d \ x | 0 | 1 | 2 | 3 | 4 |
|---|---|---|---|---|---|
| 0 | 20 → 50 | 70 | 100 | 130 |  |
| 0 | 20 | 50 | 70 | 100 | 130 |
| 1 | 10 → 20 ← 30 ← 50 | 110 |  |  |  |
| 2 | 60 | 90 | 80 | 30 ← 60 |  |
| 3 | 80 | 80 | 70 | 90 | 60 |
| 4 | 20 | 60 | 60 → 110 | 50 |  |
| 5 | 20 → 70 | 70 | 120 | 80 |  |

FIG.3E $L_r(p,d) + \alpha\ (\alpha = (P1|P2|0))$

| d(0) \ d(1) | 0 | 1 | 2 | 3 | 4 | 5 |
|---|---|---|---|---|---|---|
| 0 | 20 | 40 | 60 | 60 | 60 | 60 |
| 1 | 30 | 10 | 30 | 50 | 50 | 50 |
| 2 | 100 | 80 | 60 | 80 | 100 | 100 |
| 3 | 120 | 120 | 100 | 80 | 100 | 120 |
| 4 | 60 | 60 | 60 | 40 | 20 | 40 |
| 5 | 60 | 60 | 60 | 60 | 40 | 20 |

FIG.3F

| x | 0 | 1 | 2 | 3 | 4 |
|---|---|---|---|---|---|
| $d_s$ | 0.67 | 0.8 | 0.94 | 1.75 | 3.75 |
| $d_s - d_{gt}$ | 0.0 | 0.05 | 0.04 | -0.25 | -0.25 |

FIG.3G $C_{gt}(p,d)$

| d \ x | 0 | 1 | 2 | 3 | 4 |
|---|---|---|---|---|---|
| 0 | 20 | 30 | 40 | 30 | 50 |
| 1 | 10 | 20 | 30 | 10 | 30 |
| 2 | 30 | 40 | 40 | 20 | 10 |
| 3 | 40 | 50 | 50 | 30 | 30 |
| 4 | 60 | 50 | 50 | 80 | 50 |

FIG.8A

| x | 0 | 1 | 2 | 3 | 4 |
|---|---|---|---|---|---|
| $d_{gt}$ | 0.83 | 0.83 | 1.0 | 1.16 | 2.0 |

FIG.8B $C(p,d)$

| d \ x | 0 | 1 | 2 | 3 | 4 |
|---|---|---|---|---|---|
| 0 | 20 | 30 | 80 | 30 | 50 |
| 1 | 10 | 20 | 40 | 10 | 30 |
| 2 | 30 | 40 | 50 | 20 | 10 |
| 3 | 40 | 50 | 50 | 30 | 30 |
| 4 | 60 | 50 | 50 | 80 | 50 |

FIG.8C

| x | 0 | 1 | 2 | 3 | 4 |
|---|---|---|---|---|---|
| $d_s$ | 0.83 | 0.83 | 1.30 | 1.16 | 2.0 |
| $d_s - d_{gt}$ | 0.0 | 0.0 | 0.30 | 0.0 | 0.0 |

FIG.8D $L_r(p,d)$ $(r=(1,0), P1=10, P2=20)$

| d \ x | 0 | 1 | 2 | 3 | 4 |
|---|---|---|---|---|---|
| 0 | 20 | 40 | 100 | 40 | 60 |
| 1 | 10 | 20 | 40 | 10 | 30 |
| 2 | 30 | 50 | 60 | 30 | 20 |
| 3 | 40 | 70 | 70 | 50 | 50 |
| 4 | 60 | 70 | 70 | 100 | 70 |

FIG.8E

| x | 0 | 1 | 2 | 3 | 4 |
|---|---|---|---|---|---|
| $d_s$ | 0.83 | 0.90 | 1.25 | 1.10 | 1.75 |
| $d_s - d_{gt}$ | 0.0 | 0.07 | 0.25 | -0.06 | -0.25 |

FIG.8F $C(p,d)$

| $d$ \ $x$ | 0 (0) | 1 (0.5) | 2 (1.0) | 3 (1.5) | 4 (2.0) | 5 (2.5) | 6 (3.0) | 7 (3.5) | 8 (4.0) |
|---|---|---|---|---|---|---|---|---|---|
| 0(0.0) | 40 | 50 | 60 | 110 | 160 | 110 | 60 | 80 | 100 |
| 1(0.5) | 23 | 33 | 43 | 75 | 107 | 70 | 34 | 52 | 70 |
| 2(1.0) | 20 | 30 | 40 | 60 | 80 | 50 | 20 | 40 | 60 |
| 3(1.5) | 34 | 43 | 53 | 65 | 77 | 50 | 23 | 26 | 30 |
| 4(2.0) | 60 | 70 | 80 | 90 | 100 | 70 | 40 | 30 | 20 |
| 5(2.5) | 70 | 80 | 90 | 95 | 100 | 75 | 50 | 40 | 30 |
| 6(3.0) | 80 | 90 | 100 | 100 | 100 | 80 | 60 | 60 | 60 |

FIG.9A $L_r(p,d)\ (r=(1,0), P1=10, P2=20)$

| $d$ \ $x$ | 0 (0) | 1 (0.5) | 2 (1.0) | 3 (1.5) | 4 (2.0) | 5 (2.5) | 6 (3.0) | 7 (3.5) | 8 (4.0) |
|---|---|---|---|---|---|---|---|---|---|
| 0 | 40 | 63 | 76 | 129 | 180 | 130 | 80 | 100 | 120 |
| 1(0.5) | 23 | 36 | 49 | 84 | 117 | 80 | 44 | 62 | 84 |
| 2(1.0) | 20 | 30 | 40 | 60 | 80 | 50 | 20 | 40 | 64 |
| 3(1.5) | 34 | 53 | 63 | 75 | 87 | 57 | 30 | 36 | 30 |
| 4(2.0) | 60 | 90 | 100 | 110 | 120 | 87 | 57 | 50 | 30 |
| 5(2.5) | 70 | 100 | 110 | 115 | 120 | 95 | 70 | 60 | 50 |
| 6(3.0) | 80 | 110 | 120 | 120 | 120 | 100 | 80 | 80 | 80 |

FIG.9B

| $x$ | 0 | 1 | 2 | 3 | 4 | 5 | 6 | 7 | 8 |
|---|---|---|---|---|---|---|---|---|---|
| $d_s$ | 0.84 | 0.85 | 0.89 | 1.06 | 1.17 | 1.16 | 1.10 | 1.36 | 1.75 |
| $d_s - d_{gt}$ | 0.01 | | 0.06 | | 0.17 | | -0.06 | | -0.25 |

FIG.9C $C(p, d)$

| d \ x | 0 | 1 | 2 | 3 | 4 |
|---|---|---|---|---|---|
| 0 | 20 | 30 | 80 | 30 | 50 |
| 0.5 | 11 | 21 | 54 | 16 | 40 |
| 1.0 | 10 | 20 | 40 | 10 | 30 |
| 1.5 | 16 | 26 | 39 | 11 | 15 |
| 2.0 | 30 | 40 | 50 | 20 | 10 |
| 2.5 | 35 | 45 | 50 | 25 | 15 |
| 3.0 | 40 | 50 | 50 | 30 | 30 |

FIG.12A $L_r(p, d)$ $(r = (1,0), P1 = 5, P2 = 10)$

| d \ x | 0 | 1 | 2 | 3 | 4 |
|---|---|---|---|---|---|
| 0 | 20 | 36 | 87 | 40 | 60 |
| 0.5 | 11 | 22 | 56 | 21 | 45 |
| 1.0 | 10 | 20 | 40 | 10 | 30 |
| 1.5 | 16 | 31 | 44 | 15 | 20 |
| 2.0 | 30 | 50 | 60 | 29 | 20 |
| 2.5 | 35 | 55 | 60 | 35 | 25 |
| 3.0 | 40 | 60 | 60 | 40 | 40 |

FIG.12B

| $x$ | 0 | 1 | 2 | 3 | 4 |
|---|---|---|---|---|---|
| $d_s$ | 0.82 | 0.83 | 1.15 | 1.09 | 1.75 |
| $d_s - d_{gt}$ | -0.01 | 0.0 | 0.15 | -0.07 | -0.25 |

FIG.12C

IMAGE PROCESSING METHOD AND IMAGE PROCESSING APPARATUS

BACKGROUND OF THE INVENTION

Field of the Invention

The present invention relates to an image processing method and to an image processing apparatus configured to calculate a parallax amount of an object imaged in first and second images respectively imaged from positions separated by a predetermined base length.

Description of the Related Art

There have been proposed various methods for calculating a parallax from a plurality of parallax images, e.g., two, obtained by stereoscopically imaging an object from positions separated by a predetermined base length. For instance, there is a method of detecting corresponding points corresponding with each other among images by means of an image search processing such as a block matching method and of calculating a parallax from amounts of difference of positions, i.e., coordinates, of the corresponding points in each image.

According to the image search processing, a reference area within an image photographed by one camera is compared with a comparison area within an image photographed by another camera to find matching costs among the areas. The matching costs described here are indicators indicating how two same size images are different. For instance, in comparison by means of a Sum of Absolute Difference (SAD) method, values in which absolute values of differences of pixel values at same coordinates within each image are summed for all pixels are used as the matching costs. The matching costs in the SAD method are zeroed when the two images are totally same and increase as differences of the images increase. The SAD enables to calculate a parallax by comparing a plurality of comparison areas and by setting the comparison area where the matching cost is minimized as a corresponding point to the reference area.

Besides the SAD method, there are a Sum of Squared Difference (SSD) method, a Zero Means Normalized Cross Correlation (ZNCC) method and others as a method for comparing among areas. Resultant values thus calculated can be utilized as the matching costs in the case of the SAD and SSD methods. Note that in the ZNCC method, the higher the degree of similarity between the areas, the higher the comparison resultant values, i.e., the matching costs, are. In this case, the parallax calculating method is corrected by setting an area where an inverse number of the resultant value is highest as the corresponding point or by setting an area where the resultant value as the matching cost is highest as the corresponding point.

Because the parallax calculated by the image search processing is in the unit of pixels, there is a case where it is unable to obtain a necessary parallax resolution depending on the resolution of the image. In such a case, it is possible to calculate the parallax in high accuracy, i.e., in the accuracy of sub-pixels, by fitting a distribution of the matching costs to an appropriate matching cost distribution function.

It is also possible to measure a distance from the camera to an object by applying the principle of triangulation to the calculated parallax amount. However, in a case where texture of a surface of the object is weak and is poor in terms of luminance variation or in a case where noise has been generated in the photographed image, the image search processing is liable to cause an error in the calculation of the matching costs and the accuracy of the parallax calculation drops.

By taking such problem into consideration, there is known a technology of generating a cost map in which not only matching cost information of a target reference area but also matching costs of the whole image are integrated and of conducting semi-global optimization by using the matching costs in the reference area around the target area. As such method, a SGM (Semi-Global Matching) method is known for example. This method enables to execute highly accurate parallax calculation. A cost map used in the method of this sort is what matching costs calculated for combinations of all reference and comparison areas are stored in a three dimensional arrays for example. The SGM method is utilized as a parallax calculating method that achieves both accuracy and processing speed, and there have been known various proposals, e.g., Japanese patent application laid-open No. 2015-143677, as a parallax calculating method utilizing the SGM method.

In order to describe a subject of the present disclosure, an outline of the SGM method related to the subject matter of the present disclosure will be described below. Still further, it is assumed that images to be inputted are imaged by a parallel stereoscopic camera and are parallelized images from which distortion of lenses is removed in advance.

The parallax calculation utilizing the SGM method is roughly composed of three steps of a cost map generating process, a synthesized cost map generating process and a sub-pixel parallax generating process.

In the cost map generating process, a cost map is generated from the first and second images obtained from two cameras by a known method such as the SAD method. For instance, FIG. 1A illustrates a rectangular area, i.e., a reference area, within the first image imaged by the first camera and FIG. 1B illustrates a rectangular area, i.e., a comparison area, having a same size with a certain reference area in the second image imaged by the second camera. A cost map thereof is what matching costs of the rectangular area, i.e., the comparison area, having the same size with the reference area within the second image with respect to the rectangular area, i.e. the reference area, within the first image are calculated per x and y coordinates and the parallax of the reference area and is what these calculated matching costs are stored in a three-dimensional array.

For instance, consider a case where the matching costs are calculated in the unit of pixels for a range of parallax candidate d=0 to D pixels on the reference area whose upper left position is located at x coordinate=x and at y coordinate=y as illustrated in FIG. 1A. In this case, the matching costs are calculated respectively for the comparison area whose upper left position is located at x coordinate=x to x−d and at y coordinate=y as illustrated in FIG. 1B and are stored in a cost map of a three-dimensional array as illustrated in FIG. 1C. FIG. 1D illustrates one example in which a part of the cost map of the three-dimensional array is cut out with a plane of y=0, i.e., five pixels of the x coordinate=0 to 4, the y coordinate=0, and parallax candidates d=0 to 4, i.e., a hatched part in FIG. 1C. The matching costs calculated corresponding to the parallax candidates d=0 to 4 for each of the five pixels within the first image are stored in FIG. 1D.

In a case where the SAD method is used in calculating the matching costs, the matching cost turns out to be a sum of absolute values of differences of luminance values of the respective pixels in the reference area and in the comparison area That is, the matching costs $C(x, y, d)$ of the x coordinate=x, y coordinate=y and parallax=d can be expressed by the following equation 1. Here in the equation 1, $S_{(x, y)}$ denotes the luminance value of the first image at the x coordinate=x and y coordinate=y, and $R_{(x-d, y)}$ denotes the luminance value of the second image at the x coordinate=x and y coordinate=y. Still further, $B_x$ denotes a size in the x-direction of the reference area and $B_y$ denotes a size in the y-direction of the reference area:

$$C(x, y, d) = \sum_{X \in [x, x+B_x]} \sum_{Y \in [y, y+B_y]} |S_{(X,Y)} - R_{(X-d,Y)}| \quad \text{Equation 1}$$

Note that although the parallax candidates are set as 0 to D pixels for convenience in the above equation 1, the parallax candidates may be expressed by minus values depending on an installation method of the cameras and image processing performed in advance. Still further, the equation 1 is one example of a case where the first image is imaged by a left camera of the parallel stereoscopic camera and the second image is imaged by a right camera, so that the coordinates and others in each comparison area may differ depending on a configuration of the imaging device imaging the first and second images. Note that there exists pixels to which the equation 1 cannot be applied in a case where only pixels of $B_x$ pixels exist between the x coordinate=x and an image edge for example in the first and second images. For such pixels, it is possible to arrange such that an exceptional processing of calculating no matching cost or of executing calculations of adding pixels having appropriate pixel values around the first and second images. Still further, in a case where a character expression using ligature including symbols such as tilde, hat and dash is cited within a text below, those symbols are denoted by postposing the characters.

In the synthesized cost map generating process, a synthesized cost map is generated by is synthesizing penalty costs P1 and P2 of variation of the parallax amount to the cost map generated by the cost map generating process. In calculating the synthesized cost, an r-direction synthesized cost Lr is calculated first sequentially from the image edge in a certain cost integrating direction r. Here, r is such a vector expressed by p'−p=r, where r is a certain target pixel coordinate p=(x, y) and p' is a next target pixel coordinate neighboring p. For instance, in a case where costs are to be integrated in an x-forward direction, r turns out to be r=(1, 0) and in a case where costs are to be integrated in a minus direction obliquely with 45 degrees in the x and y coordinates, r turns out to be r=(−1, −1). The SGM method calculates the synthesized cost $L_s$ by using the synthesized cost $L_r$ in the r-direction calculated in each of a plurality of cost integrating directions r.

Here, FIG. 2 illustrates an example of the cost integrating directions in integrating costs from eight directions. In FIG. 2, a suffix is added to each cost integrating direction r to distinguish the cost integrating directions, and an $i^{-th}$ cost integrating direction is denoted as a cost integrating direction $r_i$. Note that the cost integrating direction r may be set at any number of directions such as 4 directions or 16 directions.

Specifically, $L_r$ can be calculated by using the following equation 2. Here, C (p, d)=C (x, y, d) in the equation 2:

$$L_r(p, d) = C(p, d) + \min\begin{pmatrix} L_r(p-r, d) \\ L_r(p-r, d+1) + P1 \\ L_r(p-r, d-1) + P1 \\ \min_i L_r(p-r, d+i) + P2 \end{pmatrix} - \min_i L_r(p-r, d+i) \quad \text{Equation 2}$$

In the equation 2, the r-direction synthesized cost $L_r$ at the target pixel is equalized with a matching cost with a parallax equalized with a parallax where an r-direction synthesized cost $L_r$ of a previous target pixel is minimized. Then, the r-direction synthesized cost $L_r$ at the target pixel turns out to be a value in which the penalty cost of P1 is added to the matching cost in a case where the parallax has changed by 1 pixel and the penalty cost of P2 is added to the matching cost in a case where the parallax has changed by 2 pixels or more. It is necessary for P1 and P2 to meet a relationship of P1<P2 in order to obtain an appropriate result by the SGM method. The user is advised to set P1 and P2 in advance through a user interface corresponding to peculiarities of the configuration of the cameras, the control condition, an installation environment and the object. Or, it is also possible to arrange such that a control unit automatically sets them corresponding to the peculiarities of the configuration of the cameras, the control condition, the installation environment and the object.

P1 and P2 can be determined corresponding to sizes in the x-direction and y-direction of the reference area of the first image, i.e., in the unit of the parallax amount calculation. For instance, luminous values of each image are expressed by integer values of 0 to 255 and such values as P1=8×$B_x$×$B_y$ and P2=24×$B_x$×$B_y$ are used in the following exemplary embodiments.

That is, the penalty costs P1 and P2 may take values proportional to the unit of the parallax amount calculation of the matching costs, and the synthesized costs related to the reference area can be calculated by acting the penalty costs P1 and P2 on the matching costs.

FIGS. 3A through 3G illustrate specific examples of calculation processes of the r-direction synthesized cost. FIG. 3A illustrates one example of partial ideal values of the cost map cut out by a plane y=0 and FIG. 3C illustrates one example of actually obtained values. Note that bold parts in FIGS. 3A and 3C indicate least matching costs for the same pixel. In this example, it is assumed that while the matching cost is least at d=4 due to an influence of a matching cost calculation error caused by noise or the like of the image in the pixel of x=2, matching costs are normally calculated in other pixels. Although the matching cost calculation error occurs to certain noise in a plurality of pixels in an actual image, it is assumed that the error has occurred only in the pixel of x=2 for convenience of the description. FIG. 3E illustrates an example of the cost map in which the costs are integrated from the image left edge with P1=20 and P2=40 in accordance to r=(1, 0). Arrows in FIG. 3E indicate which candidate values are integrated in a min function of the second item of the equation 2. Because pixels at x=0 are the image edge, the matching costs turn out to be the r-direction synthesized costs as they are.

Next, the cost integration method of pixels of x=1 will described in detail with reference to FIG. 3F. FIG. 3F is what candidate values within the min function of the second item of the equation 2 are arranged by taking parallax candidates d(1) in x=1 as a column and by taking parallax candidates d(0) in x=0 as a row.

That is, one column indicates all candidate values within the min function for a certain parallax candidate value d(1). For instance, as for a column of d(1)=0, because there is no parallax variation in the cell of d(0)=0, C((0, 0), 0)=20 turns out to be the candidate value as it is. Because the parallax variation occurs by one pixel in the cell of d(0)=1, a value of 30 in which the penalty cost P1=20 is added to C((0, 0), 1) is turned out to be a candidate value. Still further, because the parallax variation occurs by two or more pixels in the cells of d(0)=2 to 5, values in which the penalty cost P2=40 is added to C((0, 0), d(0)) is turned out to be candidate values. The candidate values of d(0)=0 of the least values among the abovementioned candidate values are integrated. Still further, because the matching costs of d(0)=0 is minimized when d(0)=1, they are calculated as $L_r$((1, 0), 0)=C((1, 0), 0)+C((0, 0), 0)−C((0, 0), 1). A similar calculation is made also on d(1)=1 to 5, and thereby, candidate values of d(1)=1, d(0)=1 for 2, d(1)=3 for 3, d(0)=4 for 4 and d(0)=5 for d(1)=5 are integrated, respectively.

Then, noticing on pixels of x=2, candidate values of d(1)=1 are selected for all parallax candidates, and costs other than d(2)=1 are synthesized with the penalty. Thereby, $L_r$ ((2, 0), 1)=30 and $L_r$((2, 0), 4)=60, and the r-direction synthesized costs of d(2)=1 are correctly minimized. Still further, noticing on pixels of x=3 and x=4, their minimum matching costs are correctly calculated, so that they are reduced remarkably as compared to the matching costs to other parallaxes. d=1 where the r-direction synthesized cost $L_r$ turns out to be minimum in x=2 and parallaxes where the matching costs are minimized in x=3 and x=4 are different, respectively. Due to that, the penalty costs are synthesized in these pixels, the parallax where the cost is minimized does not change and a correct parallax is maintained. It is possible to calculate the r-direction synthesized cost to a right edge of the image by repeating the similar process.

A synthesized cost $L_s$ can be calculated by the following equation 3 by using the r-direction synthesized cost $L_r$ calculated in the r-direction by using the equation 2:

$$L_S(p, d) = \sum_r L_r(p, d) \quad \text{Equation 3}$$

In the sub-pixel parallax generating process, a parallax where similarity is highest is estimated for each pixel of the first image from the synthesized cost map generated by the synthesized cost map generating process. Normally, luminance values smoothly change in an image imaged by a camera. Therefore, it is possible to consider that the synthesized costs also smoothly change in accordance to some correlation function, and a parallax where the correlation function is minimized is a parallax in the accuracy of sub-pixels.

In the sub-pixel parallax estimation, it is possible to estimate the correlation function by fitting three synthesized costs of a parallax where the synthesized cost is minimized and parallaxes before and after that for a certain pixel in the first image to a quadratic function. Here, not only the quadratic function but also a primary symmetric function or an asymmetric function may be used for the correlation function. Still further, the number of synthesized costs to be fitted needs not be only three, and many more values may be used.

A method for estimating the sub-pixel parallax by using the synthesized costs to three parallaxes will be specifically described by assuming the correlation function as the quadratic function and by making reference to FIG. 4. A parallax where the synthesized cost is minimized within the synthesized cost map at a certain pixel coordinate p of the first image is denoted as $d_m$, a parallax in the accuracy of sub-pixels as $d_s$ and as d'=d−$d_m$. FIG. 4 is what the synthesized cost $L_s$ (p, d'+$d_m$) is graphed as a quadratic function of d'. Here, it is possible to consider the synthesized cost $L_s$ (p, d'+$d_m$)=a ((d'−b))$^2$+c, and a relationship of the following equation 4 holds. Here, $A^T$ indicates translocation of a matrix A:

$$\begin{pmatrix} L_s(p, d_m + 1) \\ L_s(p, d_m) \\ L_s(p, d_m - 1) \end{pmatrix}^T = \begin{pmatrix} a \\ -2ab \\ ab^2 + c \end{pmatrix}^T \begin{pmatrix} 1 & 0 & 1 \\ 1 & 0 & -1 \\ 1 & 1 & 1 \end{pmatrix} \quad \text{Equation 4}$$

It is possible to find b by solving the equation 4 about b as expressed by the following equation 5:

$$b = \frac{L_s(p, d_m - 1) - L_s(p, d_m + 1)}{2L_s(p, d_m + 1) - 4L_s(p, d_m) + 2L_s(p, d_m - 1)} \quad \text{Equation 5}$$

It is possible to calculate the parallax in the accuracy of sub-pixels as $d_s$=$d_m$+b by using a result of the equation 5. The sub-pixel parallax to the whole image can be generated by performing the sub-pixel parallax estimation to each pixel of the first image. The parallax calculation by means of the SGM method can be performed as described above.

Finally, examples of effects of the SGM method in the parallax calculation will be described with reference to FIGS. 3A through 3G. FIG. 3B illustrates parallax ideal values $d_{gt}$ in the accuracy of sub-pixels in a table format. FIGS. 3D and 3G illustrate results of the sub-pixel parallaxes estimated from the cost map in FIG. 3C and the synthesized cost map in FIG. 3E and differences from the ideal values d in table formats. In the example, however, the cost are integrated on in the direction of r=(1. 0) in the synthesized cost map generating process. While an error of three pixels or more has occurred about the pixel of x=2 in FIG. 3D, the error is corrected to 0.04 pixel in FIG. 3G. In the same time, the parallax is estimated to be small about pixels of x=3, 4 by an effect of smoothing the parallax variation.

While the SGM method has been schematically described above, there are many cases where the parallax changing quantity is small and becomes less than one pixel even if the distance between the object and the camera changes in a stereoscopic camera having a short base length in general. Meanwhile, the prior art SGM method generates a cost map in which matching costs calculated in the unit of pixels are integrated and optimizes in a case where a parallax amount with an adjacent pixel differs by one pixel or more by giving penalty costs. Therefore, it is unable to obtain the effect of optimization of the SGM method in a case where the parallax changing quantity with the adjacent pixel is one pixel or less and errors of the matching costs cannot be corrected. Thus, the SGM method has a problem that the accuracy of the parallax calculation drops.

SUMMARY OF THE INVENTION

According to a first aspect of the present invention, an image processing method, includes a matching cost calculating process of calculating matching costs in a unit of sub-pixels having higher resolution than first and second images by using an image of a reference area contained in the first image in which a target object is imaged and images of a plurality of comparison areas contained in the second image in which the target object is imaged, and a synthesized cost calculating process of calculating synthesized costs related to the reference area based on comparison results of values related to the plurality of matching costs calculated in the matching cost calculating process.

According to a second aspect of the present invention, an image processing apparatus, includes an image acquisition portion configured to acquire first and second images in which a target object is imaged, a cost map generating portion configured to calculate matching costs in a unit of sub-pixels having higher resolution than the first and second images by using an image of a reference area contained in the first image and images of a plurality of comparison areas contained in the second image, and a synthesized cost calculating portion configured to calculate synthesized costs related to the reference area based on comparison results of values related to the plurality of matching costs calculated by the cost map generating portion Further features of the present invention will become apparent from the following description of exemplary embodiments with reference to the attached drawings.

BRIEF DESCRIPTION OF THE DRAWINGS

FIG. 1A is a diagram illustrating a reference area.
FIG. 1B is a diagram illustrating a comparison area.
FIG. 1C is a diagram illustrating a cost map.
FIG. 1D illustrates examples in which a part of the cost map is cut out with a certain plane.
FIG. 3A is a table indicating ideal values of the cost map.
FIG. 3B is a table indicating ideal values of sub-pixel parallaxes.
FIG. 3C is a table indicating the cost map actually obtained.
FIG. 3D is a table indicating sub-pixel parallaxes estimated from FIG. 3C.
FIG. 3E is a table indicating a synthesized cost map.
FIG. 3F is a table illustrating a synthesized cost generating method.
FIG. 3G is a table indicating the sub-pixel parallaxes estimated from FIG. 3E.
FIG. 8A is a table indicating ideal values of the cost map.
FIG. 8B is a table indicating ideal values of sub-pixel parallaxes.
FIG. 8C is a table indicating a cost map respectively actually obtained.
FIG. 8D is a table indicating sub-pixel parallaxes estimated from FIG. 8C.
FIG. 8E is a table indicating synthesized cost map.
FIG. 8F is a table indicating the sub-pixel parallaxes estimated from FIG. 8E.
FIG. 9A is a table indicating a cost map in the unit of sub-pixels.
FIG. 9B is a table indicating synthesized cost map.
FIG. 9C is a table indicating the sub-pixel parallaxes estimated from FIG. 9B.
FIG. 12A is a table indicating a sub-pixel unit cost map according to the second exemplary embodiment.
FIG. 12B is a table indicating the synthesized cost map according to the second exemplary embodiment.
FIG. 12C is a table indicating sub-pixel parallaxes estimated from FIG. 12B according to the second exemplary embodiment.

DESCRIPTION OF THE EMBODIMENTS

Exemplary embodiments for carrying out the present disclosure will be described with reference to the drawings. It is noted that the following configurations are exemplary to the end and detailed configurations may be appropriately modified by a person skilled in the art within a scope not departing from a gist of the present disclosure for example. Still further, numerical values adopted in the present exemplary embodiments are reference values and do not limit the present disclosure by any means.

The following exemplary embodiments relate to an apparatus configured to calculate a parallax from images obtained by two imaging devices. The configuration of the present exemplary embodiment may be utilized in measuring of a distance between an object and the apparatus, in measuring a shape of the object and the like by using calculation results thereof. Specifically, the configuration of the present exemplary embodiment may be suitably applied to a case of calculating a parallax by a small-scale system utilizing a stereoscopic camera or the like having a short base length.

Note that monochrome parallel stereoscopic cameras are used for the following first and second imaging devices for convenience, so that optical axes are parallel and have no deviation in a vertical (y) direction in terms of positions of the cameras and photographed images are monochrome paralleled images from which distortions of lenses are removed. Still further, the SAD method is used fin generating a cost map. However, these conditions do not limit the present disclosure, and the present disclosure can be carried out even if the camera setting is different, i.e., even if optical axes cross with each other or are located at twisted positions and the cameras are color cameras. The present disclosure can be carried out also in a case where a method other than the SAD method is used, i.e., in a case where an SSD method or a ZNCC method is used.

First Exemplary Embodiment

Figure 2:
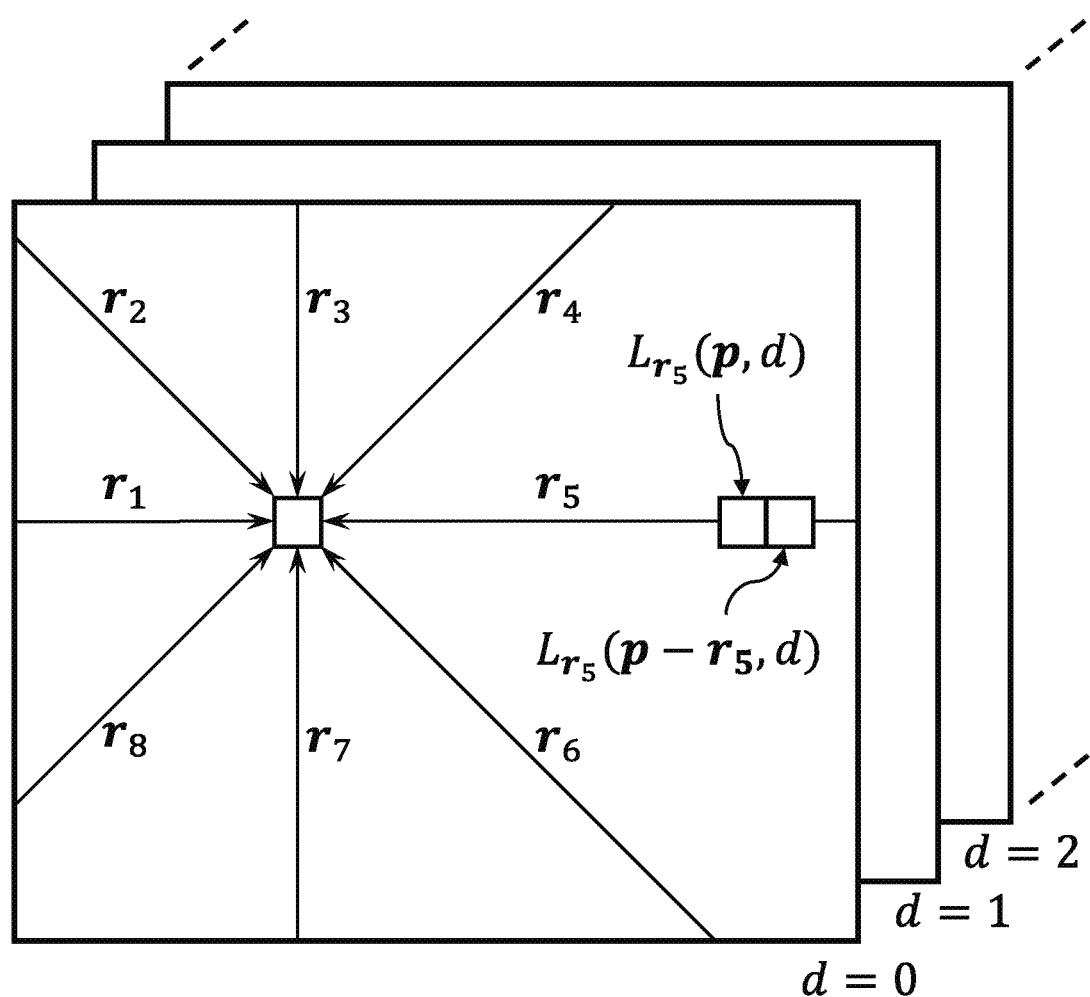
FIG. 2 a diagram illustrating cost integration in a synthesized cost generating process.
Figure 4:
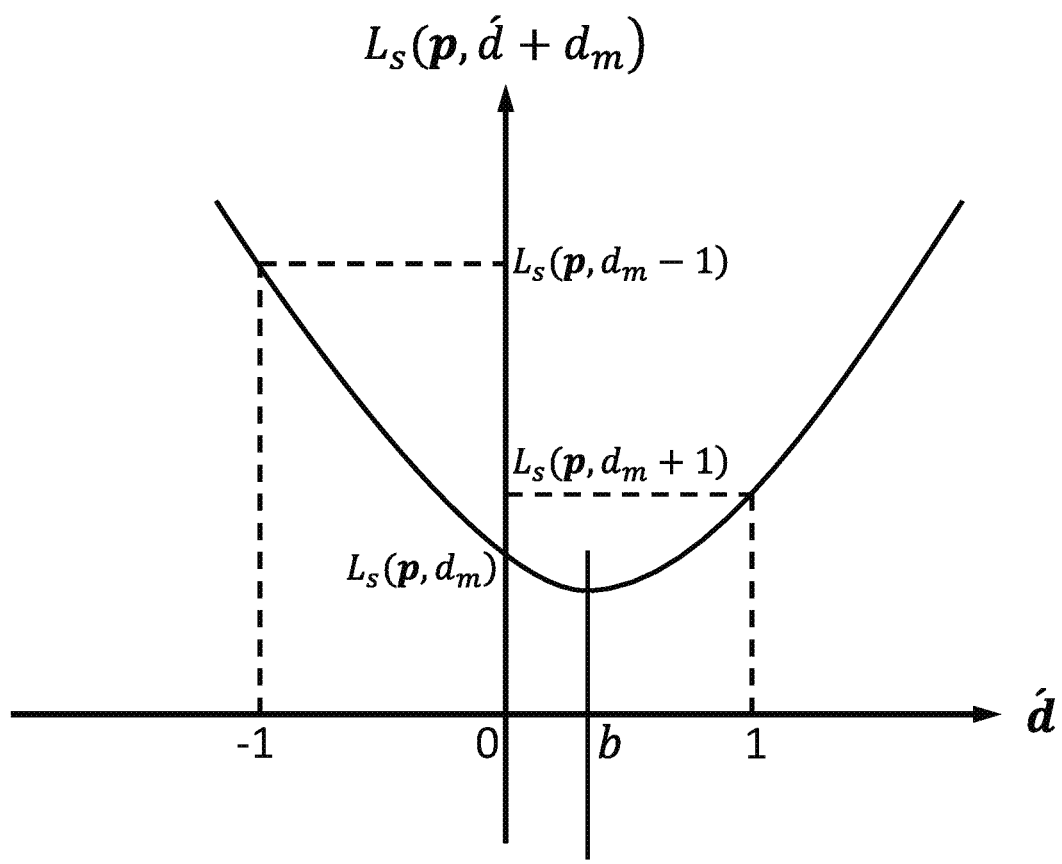
FIG. 4 is a chart indicating a correlation function in the sub-pixel parallax generating process.
Figure 5:
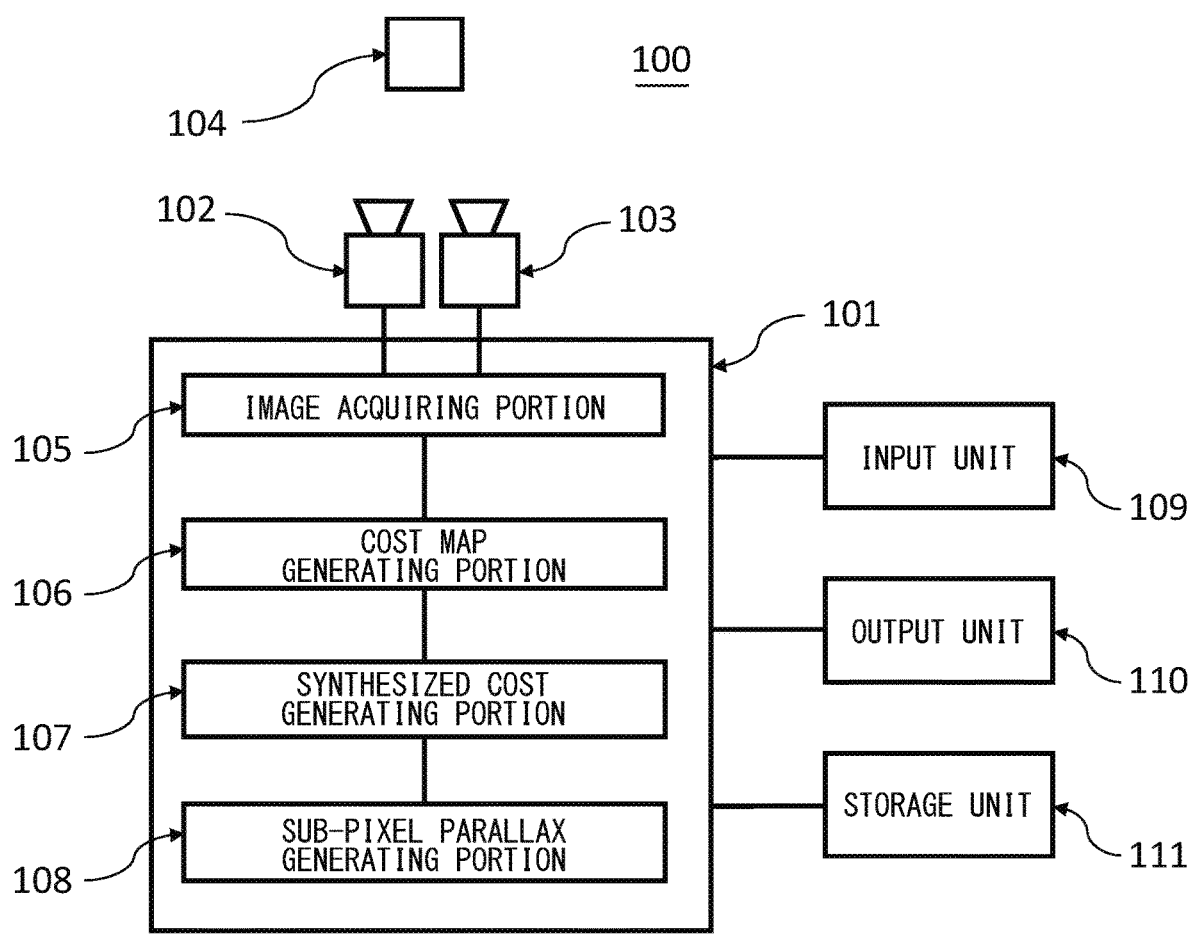
FIG. 5 is a block diagram illustrating a schematic structure of a parallax calculating apparatus according to a first exemplary embodiment of the present disclosure.

In the present exemplary embodiment, FIG. 5 illustrates a schematic structure of an image processing apparatus 100 configured to execute parallax calculation as an image processing method of the present disclosure.

The image processing apparatus 100 illustrated in FIG. 5 comprises hardware such as an apparatus body 101, a first imaging device 102, a second imaging device 103, an input unit 109, an output unit 110 and a storage unit 111. The first and second imaging devices 102 and 103 are devices for simultaneously imaging a color or monochrome still image or a moving image under the same setting condition to take into the apparatus body 101. These imaging devices may be constructed by two digital cameras or by a stereoscopic camera in which imaging optical systems are disposed in parallel with each other.

The imaging devices 102 and 103 may be a device capable of imaging a plurality of images by one unit and having the both functions of the first and second imaging devices 102 and 103 such as a camera using an image surface phase difference system. Although the first and second imaging devices 102 and 103 are separated in the present exemplary embodiment, they may not image stereoscopically by always using two imaging devices. For instance, it is possible to image in the same manner with the case of using the two imaging devices just by using one imaging device by relatively moving the object and the imaging device and by imaging by a plural times at different image capture positions separated by a distance corresponding to the base length of the first and second imaging devices 102 and 103.

The object 104 imaged by the first and second imaging devices 102 and 103 is a workpiece handled or detected in a production line for manufacturing an article or a specific part of a robot unit or a conveyer unit disposed in the production line. The first and second imaging devices 102 and 103 can measure a position and an attitude in a three dimensional space of those workpiece, robot unit or conveyor unit and can control an article manufacturing process based on measured results.

The input unit 109 is a device to be manipulated by a user to input instructions to the apparatus body 101 and may be a mouse, a keyboard, a touch panel and a dedicated console for example. The output unit 110 is a device configured to display and output a calculated parallax to the user by utilizing a liquid crystal display or on an external device by transmitting data through a network cable for example. It is possible to configure a user interface unit 400 (see FIG. 13) by the input unit 109 and the output unit 110. It is possible to use the user interface unit 400 to receive user specification regarding a parallax amount calculating unit of matching costs in the unit of sub-pixels described later.

A storage unit 111 stores various setting information such as setting of the imaging devices, set values of parallax calculation processes and a parallax calculation program referred to by the image processing apparatus 100 in the parallax calculation processes, imaging results, parallax calculation results and others. The storage unit 111 may be a removable recording medium such as a flash memory and network storage other than memory devices such as ROM and RAM and an external storage such as HDD and SSD (see FIG. 13).

The apparatus body 101 may comprise a computer with hardware such as CPU (central processing unit), a main storage device (RAM) and an auxiliary storage device such as ROM, HDD and SSD as illustrated in detail in FIG. 13 for example described later. Calculations described later may be executed by using a GPU (image calculation processing unit) and a GPU memory (VRAM), which accelerates the system.

The apparatus body 101 includes functional blocks such as an image acquiring portion 105, a cost map generating portion 106, a synthesized cost generating portion 107, a sub-pixel parallax generating portion 108 and others.

The image acquiring portion 105 performs a function of obtaining images from the first and second imaging devices 102 and 103, and the cost map generating portion 106 performs a function of generating matching costs from the images obtained by the image acquiring portion 105. The synthesized cost generating portion 107 corresponds to a functional block of generating synthesized costs based on a comparison result of first and second matching costs calculated respectively about a reference area and a plurality of different comparison areas contained in the first image. The sub-pixel parallax generating portion 108 corresponds to a function of generating a parallax calculation result in the unit of sub-pixels from the synthesized cost, i.e., to a parallax amount generating portion. For instance, these functions are realized by reading and executing a computer program stored in the auxiliary storage unit or in the main storage unit 111 by the CPU or the GPU (see FIG. 13).

Note that FIG. 5 merely illustrates one example of the system structure and all or part of the first and second imaging devices 102 and 103, the input unit 109, the output unit 110 and the storage unit 111 may be integrated in the apparatus body 101. Note that the apparatus body 101 may be composed of a computer such as a personal computer and a straight-type terminal or may be composed of a dedicated chip or an on-board computer.

Figure 13:
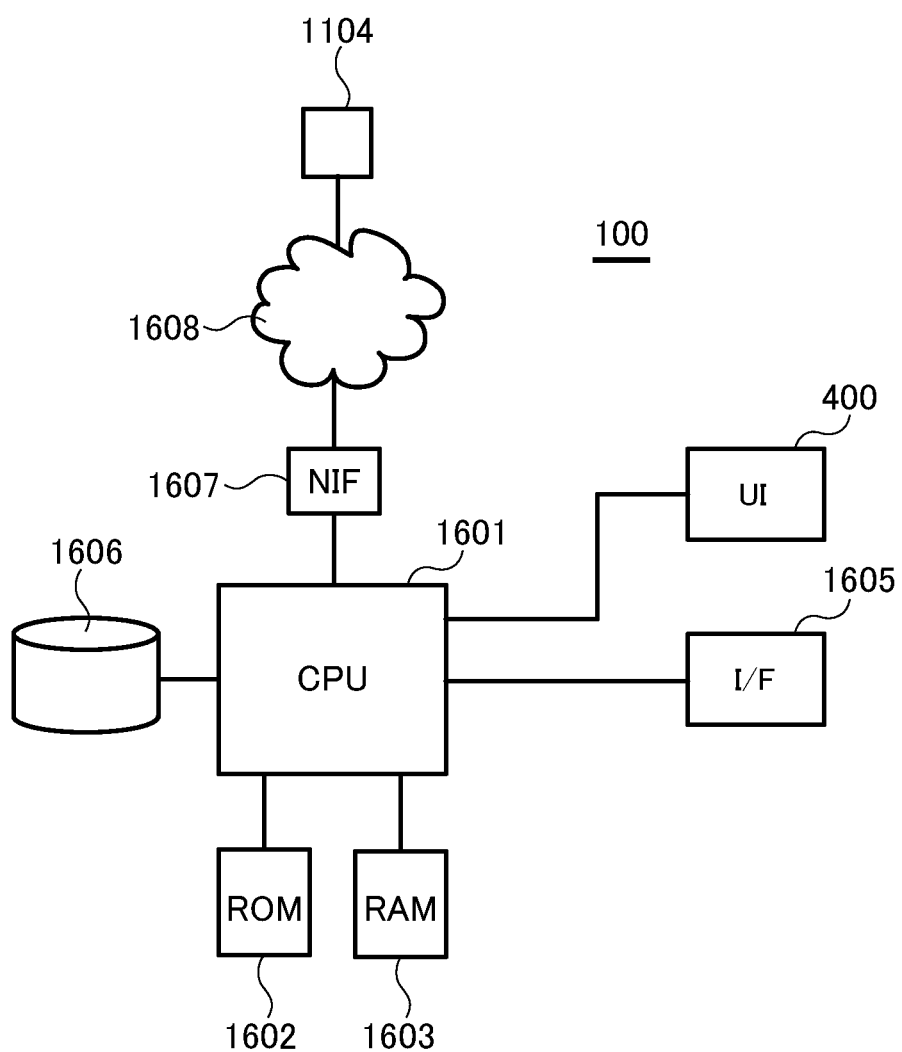
FIG. 13 is a block diagram illustrating one concrete exemplary structure of a control system of an image processing apparatus that can carry out the present disclosure.

Here, FIG. 13 illustrates one example of a concrete hardware structure of a control system composing the image processing apparatus 100 in FIG. 1. The control system as illustrated in FIG. 13 can be realized by a mode of a so-called PC form for example.

The control system illustrated in FIG. 13 can be composed of PC hardware including a CPU 1601 serving as a main control unit and a ROM 1602 and a RAM 1603 serving as storage units. Control programs, constant information and others in the CPU 1601 for realizing the image processing procedure of the present exemplary embodiment can be stored in the ROM 1602. The RAM 1603 is used also as a work area of the CPU 1601 when the control procedure is executed. Still further, the control system in FIG. 13 is connected with an external storage unit 1606. The external storage unit 1606 is not always necessary for carrying out the present disclosure, and may be composed of an external storage unit of another system mounted through network such as HDD and SSD.

An image processing of the present exemplary embodiment, e.g., the control program in the CPU 1601 for realizing processing of an inspection area specifying portion 112 and an inspection processing unit 113, is stored in a storage unit such as the external storage unit 1606 and the ROM 1602, e.g., its EEPROM area, described above. In such a case, the control program of the CPU 1601 for realizing the control procedure of the present exemplary embodiment can be supplied to each storage unit described above through a network interface 1607 or can update to a new different program. Or, the control program of the CPU 1601 for realizing the control procedure described later can be supplied to each storage unit described above and can update its contents through a storage unit such as various magnetic disks, optical disks and a flash memory and through a drive unit to that end. The various storage units, storage unit or storage device in a condition of storing the control program of the CPU 1601 for realizing the control procedure of the present exemplary embodiment composes a computer-readable storage medium storing the control procedure of the present disclosure.

The network interface 1607 for communicating through the network 1608 can be constructed by using a communication standard such as a cable communication like IEEE 802.3 and a radio communication like IEEE 802.11 and 802.15 for example. The CPU 1601 can communicate with another external unit 1104 through the network 1608. The CPU 1601 corresponds to a general control unit or a server unit of the system in which the image processing apparatus 100 is disposed. The interface 1605 is an interface enabling the CPU 1601 to communicate with an external unit and a peripheral circuit, and the CPU 1601 can communicate with the first and second imaging devices 102 and 103 through the interface 1605. Or, the first and second imaging devices 102 and 103 may be connected with the CPU 1601 through the network interface 1607 and the network 1608.

The control unit of FIG. 13 also comprises the user interface unit 400, i.e., an UI unit. A GUI unit composed of an LCD display, a keyboard and a pointing device such as a mouse and a joy stick may be disposed as the user interface unit 400. It is possible to inform a user of a progress of the image processing through the user interface unit 400. Or, it is also possible to arrange such that the user sets various parameters for controlling the image processing through the user interface unit 400.

Parallax Calculation Process

Figure 6:
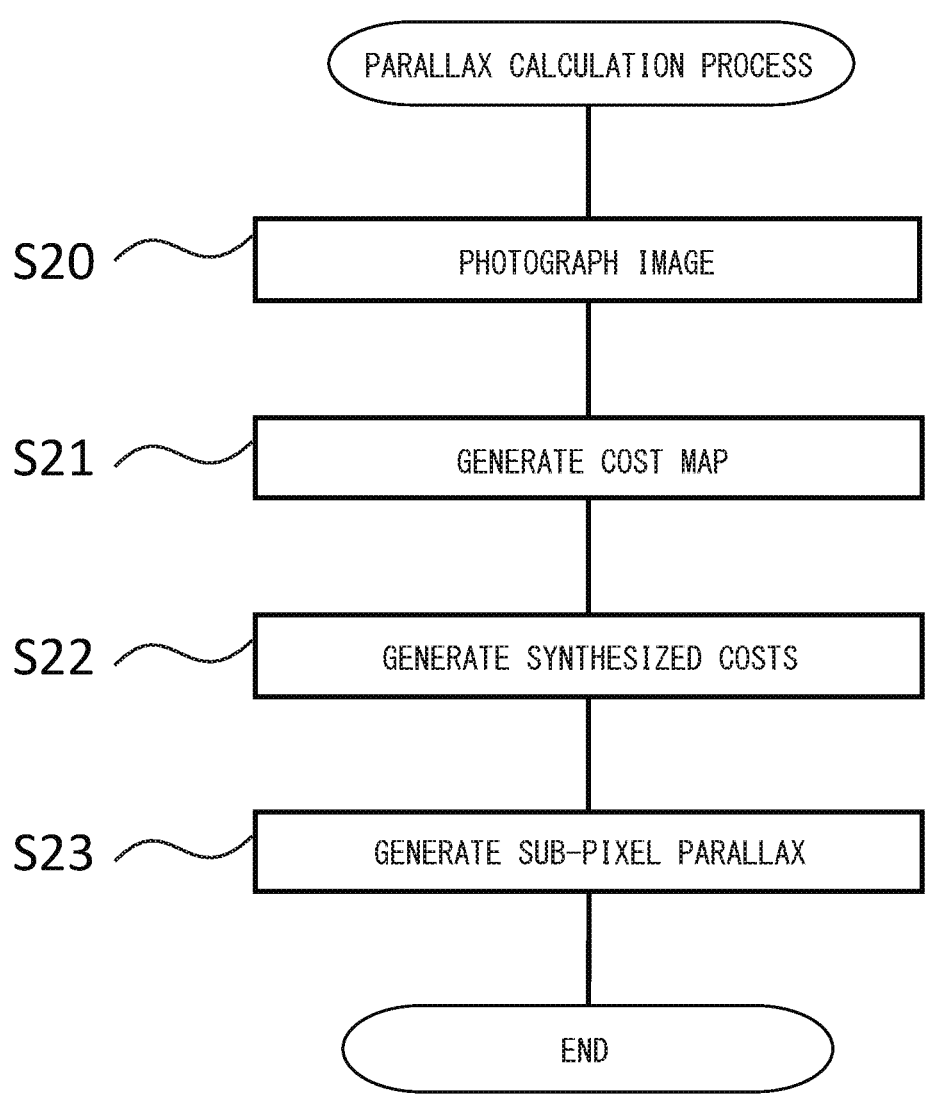
FIG. 6 is a flowchart illustrating an overall flow of a parallax calculation process according to the first exemplary embodiment of the present disclosure.
Figure 7A:
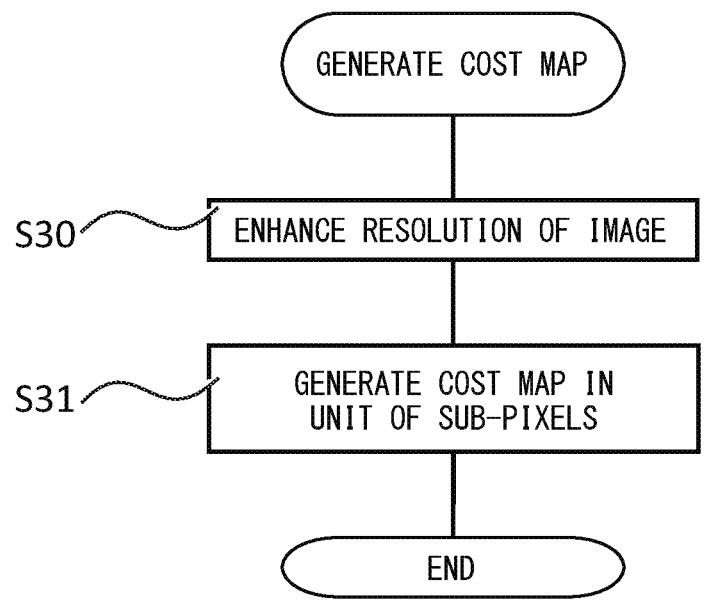
FIG. 7A is a flowchart of a cost map generating process.
Figure 7B:
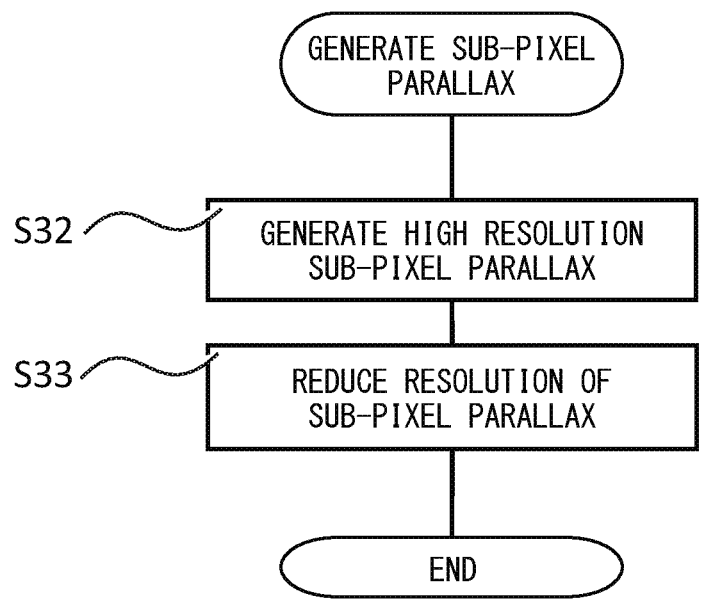
FIG. 7B is a flowchart of a sub-pixel parallax generating process.

The parallax calculation process of the image processing apparatus 100 of the present exemplary embodiment will be described with reference to FIGS. 6 and 7. FIG. 6 illustrates an overall flow of the parallax calculation process and FIGS. 7A and 7B illustrate detailed flows of the parallax calculation process of the first exemplary embodiment. The control procedures illustrated in the flowcharts in FIGS. 6 and 7 are described as an image processing program executable by the CPU 1601 illustrated in FIG. 13 and stored in an arbitrary storage device of the storage unit 111 for example. The same applies to another flowchart described later.

In an imaging step in Step S20 in FIG. 6, the object 104 is imaged by using the first and second imaging devices 102 and 103 simultaneously under control of the image acquiring portion 105 to obtain first and second images by the apparatus body 101. Note that in a case where the photographed image of the object 104 does not change by time in a case where a condition such that the object 104 and the apparatus are both fixed is met for example, imaging needs not be conducted simultaneously as described above. Still further, in a case an image of the object imaged in advance exists in the auxiliary storage unit or in the storage unit 111 of the apparatus body, data may be read from the auxiliary storage unit or the storage unit 111 instead of imaging the object. The first and second images photographed here may be displayed on the output unit 110 as necessary. Or, the first and second images may be utilized in another process other than the parallax calculation such that they are used to cause the user to input an attention area to calculate only a parallax of a part of the image.

The cost map generating portion 106 calculates matching costs in the unit of sub-pixels from the first and second images obtained in the imaging step in Step S20 to generate cost map in the unit of sub-pixels in the cost map generating step, i.e., a matching cost calculating step in Step S21. The cost map generating step in Step S21 includes an image resolution enhancing step in Step S30 and a cost map in the unit of sub-pixels generating step in Step S31.

Resolutions of the first and second images obtained in the imaging step in Step S20 are enhanced to generate first and second resolution enhanced images in the image resolution enhancing step in Step S30. An arbitrary method for expanding an image and enhancing its resolution such as a nearest-neighbor method or a bicubic method for example may be applied as the resolution enhancing process. A magnitude of the parallax to be corrected by the SGM method changes depending on how many times the resolutions of the first and second images are enhanced at this time.

For instance, in a case where a parallax estimated error of 0.5 pixel is to be smoothly corrected in the first and second images, it becomes possible to correct the error by the SGM method by enhancing the resolution twice because the parallax variation in the resolution enhanced image becomes one pixel. Still further, the resolutions of the images may be enhanced in both x- and y-directions or may be enhanced only in an epi-polar line direction of the stereoscopic image composed of the first and second images. This resolution enhancement is conducted to increase the parallax variation in the epi-polar line direction, and there is no effect of reducing the parallax amount error if the resolution enhancement is conducted in a direction orthogonal to the epipolar line direction. Due to that, it is possible to obtain the same effect as described below by enhancing the resolution only in the x-direction and to reduce a calculation load if the parallel stereoscopic camera is used for example.

in a sub-pixel unit cost map generating step in Step S31, matching costs in the unit of pixels are calculated by using an image search process such as the SAD method on the first and second resolution enhanced images generated in the image resolution enhancing step in Step S30. Thereby, a cost map is generated. At this time, a size of a reference area experientially set by a person in the art on the first and second images may be expanded in a same degree with a factor of enhancement of the resolution of the images, and thereby the same image area intended by the person in the art may be set as the reference area. Note that the generated cost map is in the unit of pixels as for the first high-resolution image. However, if the parallax of one pixel in the first high-resolution image corresponds to 0.5 pixels in the first image for example, it is equivalent to generating the cost map by calculating the matching costs in the unit of sub-pixels to the first image as a matter of course.

In the synthesized cost generating step, i.e., in the synthesized cost calculating process, in Step S22, a synthesized cost map is generated by the synthesized cost generating portion 107 by using the SGM method on the cost map in the unit of sub-pixels generated in the cost map generating step in Step S21. At this time, the system may be arranged such that values inputted by the user from the user interface unit are used as values of penalty costs P1 and P2 described above used in generating the synthesized cost maps. The penalty costs P1 and P2 may be what are inputted and set from default values set in the storage unit 111 corresponding to user inputs performed in advance or inputted every time from the input unit 109 or the like in executing the parallax calculation.

In a sub-pixel parallax generating step in Step S23, a parallax in the unit of sub-pixels to each reference area from the synthesized cost map generated in the synthesized cost map generating step in Step S22 is estimated by the sub-pixel parallax generating portion 108 to calculate a parallax distribution. The sub-pixel parallax generating step in Step S23 is composed of a high-resolution sub-pixel parallax generating step in Step S32 and a sub-pixel parallax resolution reducing step in Step S33.

In the high-resolution sub-pixel parallax generating step in Step S32, a sub-pixel parallax is generated for each pixel of the first high resolution image from the synthesized cost map generated in the synthesized cost generating step in Step S22. At this time, the sub-pixel parallax may be estimated by fitting the synthesized cost to a quadratic function or may be estimated by using another known method by fitting the synthesized cost to a nonsymmetrical function.

In the sub-pixel parallax resolution reducing step in Step S33, the resolution of the sub-pixel parallax on the first high resolution image estimated in the high-resolution sub-pixel parallax generating step in Step S32 is reduced. Because the sub-pixel parallax estimated in the high-resolution sub-pixel parallax generating step in Step S32 is what is for the resolution enhanced image, it is necessary to generate a sub-pixel parallax for the first image. To that end, the distribution of the sub-pixel parallaxes estimated in the high-resolution sub-pixel parallax generating step in Step S32 is assumed to be an image, and a process of generating the sub-pixel parallaxes for the first image is performed by reducing by the factor of the first high resolution image on the first image. Any method as long as a known image reducing method such as a bicubic method and image resampling is applicable to the reducing process of this time.

It is thus possible to calculate the parallax on the set of first and second images of the present exemplary embodiment. Note that the abovementioned processing may be executed repeatedly on each of the first and second images in a case of using a moving image or consecutively photographed still images.

It is possible to expect the following operations and advantageous effects by the present exemplary embodiment. For instance, the penalty costs P1 and P2 are not synthesized in Eq. 4 in a case where the base length is short and the parallax variation is one pixel or less even if the SGM method is applied to the prior art cost map in the unit of pixels. Due to that, the r-direction synthesized cost $L_r$ is equalized with the matching cost C. Meanwhile, if the SGM method is applied to the cost map in the unit of sub-pixels of the present exemplary embodiment, the parallax by which the matching cost becomes least varies. Accordingly, it is possible to generate the synthesized cost map which smooths parallax variation by synthesizing with the penalty costs.

Here, the operations and advantageous effects of the present exemplary embodiment will be described with reference to FIGS. 8A through 8F and 9A through 9C. FIGS. 8A through 8F illustrate a case of parallax calculation by the prior art SGM method and FIG. 9A through 9C illustrate a case where the parallax calculation method of the present exemplary embodiment is applied to the same image.

FIG. 8A is a table of ideal values of the cost map obtained in a case where the base length between the first and second imaging device 102 and 103 is short. FIG. 8C is table of the cost map actually obtained by the prior art cost map generating process and FIG. 8E illustrates the synthesized cost map in which the costs are integrated only in a direction of r=(1, 0) from the cost map. FIG. 8B indicates parallax ideal values $d_{gt}$ in the accuracy of sub-pixels in a table format, and FIGS. 8D and 8F respectively indicate results obtained by estimating the sub-pixel parallaxes from the cost map in FIG. 8C and from the synthesized cost map in FIG. 8E and differences from the ideal values $d_{gt}$.

Then, in this example, it is assumed that an error has occurred in the matching costs of x=2 and d=0 to 2 in the cost map in FIG. 8C. While an error of 0.3 pixel has occurred in the sub-pixel parallax of x=2 in FIG. 8D estimated from this cost map, parallaxes which become least matching cost in pixels of x=0 to 3 on the cost map are all d=1. Because the error is not manifested on the cost map, the error of the sub-pixel parallax of x=2 in FIG. 8F estimated from the synthesized cost map in FIG. 8E is barely corrected.

Meanwhile, FIG. 9A illustrates an example of the cost map in the unit of sub-pixels generated in the cost map generating step in Step S21 of the present exemplary embodiment. In this example however, the resolutions of the first and second images are enhanced twice in the x-direction in the image resolution enhancing step in Step S30 and the size of the reference area is expanded twice in the x-direction in the sub-pixel unit cost map generating step in Step S31. Then, it is assumed that the matching costs around the parallax where the matching cost becomes least in the cost map in FIG. 8C follow a quadratic correlation function. It is also assumed that matching costs in an image interpolated by the resolution enhancement assume values linearly interpolated from matching costs of a neighboring image. The parallax by which the matching cost of x=2, i.e., x=4 in the high-resolution image, becomes least in the sub-pixel unit cost map in FIG. 9A is different from the neighboring mage. Because the error manifests on the cost map, the error of the synthesized cost map is corrected by the synthesized cost generating step in Step S22 in FIG. 9B and an error of the sub-pixel parallax in FIG. 9C is corrected by about a half.

Second Exemplary Embodiment

While the first and second high resolution images are generated and the cost map in the unit of sub-pixels are generated by using those high resolution images in the first exemplary embodiment, the present exemplary embodiment presents an example of calculating matching costs in the unit of sub-pixels based on matching costs in the unit of pixels calculated by comparing a plurality of comparison areas contained in the second image. Note that because a hardware structure of the parallax calculating apparatus of the present exemplary embodiment is the same with the hardware structure of the parallax calculating apparatus of the first exemplary embodiment, its description will be omitted.

Parallax Calculation Process

Figure 10:
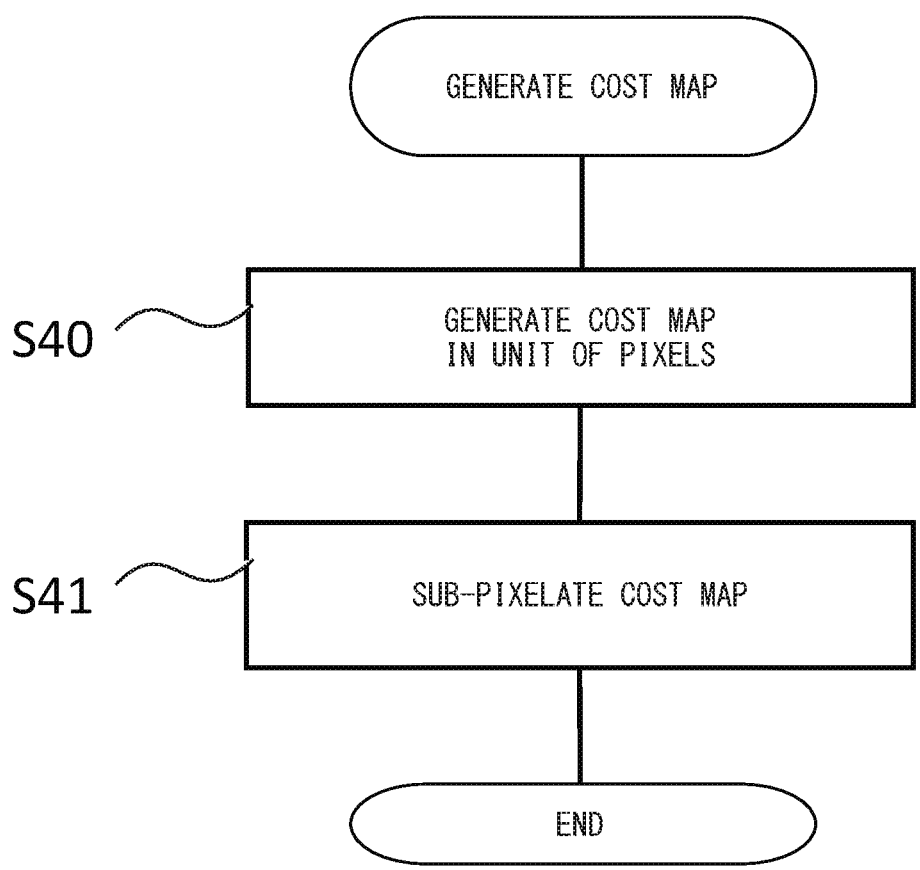
FIG. 10 is a flowchart indicating a detailed flow of a cost map generating process of a second exemplary embodiment of the present disclosure.
Figure 11:
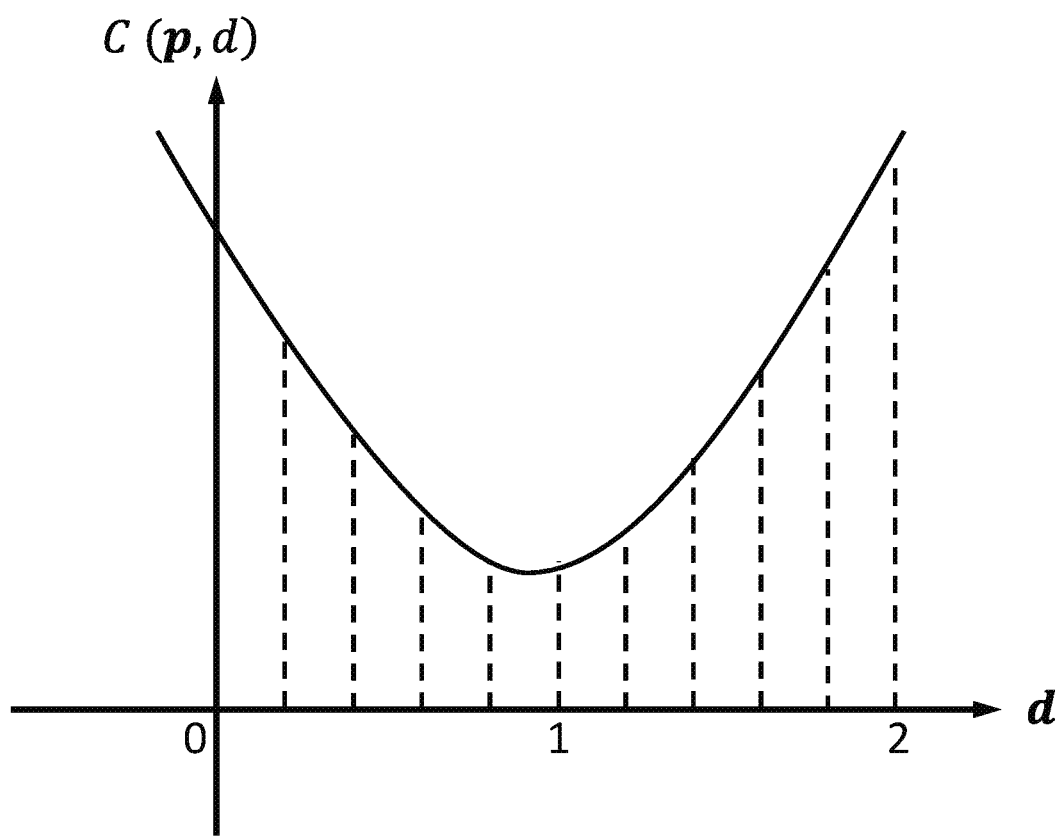
FIG. 11 is a chart illustrating cost map sub-pixeleration according to the second exemplary embodiment of the present disclosure.

Here, operations related to the parallax calculation process of the image processing apparatus 100 of the present exemplary embodiment will be described with reference to FIGS. 10 and 11. FIG. 10 illustrates a detailed flow of the cost map generating step in Step S21 of the present exemplary embodiment and FIG. 11 is a chart illustrating a cost map sub-pixelation process in a pixel unit cost map generating step in Step S40. Note that the processing contents in the overall flow of the process and in the imaging step in Step S20 are the same with those of the first exemplary embodiment. Then, only the processing contents of the cost map generating step in Step S21, the synthesized cost generating step in Step S22 and the sub-pixel parallax generating step in Step S23 will be described below.

The cost map generating portion 106 calculates matching costs in the unit of sub-pixels from the first and second images obtained in the imaging step in Step S20 to generate a cost map in the unit of sub-pixels in the cost map generating step in Step S21. The cost map generating step in Step S21 is composed of a pixel unit cost map generating step in Step S40 and a cost map sub-pixelation step in Step S41.

In the pixel unit cost map generating step in Step S40, the matching costs are calculated by using the image search process such as the SAD method from the first and second images to generate the cost map in the unit of pixels.

In the cost map sub-pixelation step in Step S41, the matching costs in the unit of sub-pixel are calculated from the cost map in the unit of pixels generated in the pixel unit cost map generating step in Step S40 to generate a cost map in the unit of sub-pixels.

A matching cost calculating procedure in the unit of sub-pixels will be described below. Firstly, a pixel at a certain coordinate p=(x, y) in the first image is noticed in the cost map. The matching costs to a range of parallax [d~−1, d~+1] in the pixel will be transformed into matching costs in the unit of sub-pixels. If it is assumed that the matching costs in the range of [d~−1, d~+1] follow the correlation function $C(p, d) = a_{d\sim}(d - b_{d\sim})^2 + C_{d\sim}$, it is possible to calculate the matching cost to arbitral sub-pixel parallax d by estimating this correlation function. FIG. 11 is what the correlation function is graphed to a parallax range of [0, 2]. Here, the following equation 6 holds from the correlation function at d'=−1, 0, 1 by setting d'=d−d~, and the following equation 7 is obtained by solving the equation 6:

$$\begin{pmatrix} C(p, \tilde{d}+1) \\ C(p, \tilde{d}) \\ C(p, \tilde{d}-1) \end{pmatrix}^T = \begin{pmatrix} a_{\tilde{d}} \\ -2a_{\tilde{d}}b_{\tilde{d}} \\ a_{\tilde{d}}b_{\tilde{d}}^2 + c_{\tilde{d}} \end{pmatrix}^T \begin{pmatrix} 1 & 0 & 1 \\ 1 & 0 & -1 \\ 1 & 1 & 1 \end{pmatrix} \qquad \text{Equation 6}$$

$$a = \frac{1}{2}(C(p, \tilde{d}+1) - 2C(p, \tilde{d}) + C(p, \tilde{d}-1)) \qquad \text{Equation 7}$$

$$b = \frac{C(p, \tilde{d}-1) - C(p, \tilde{d}+1)}{2C(p, \tilde{d}+1) - 4C(p, \tilde{d}) + 2C(p, \tilde{d}-1)}$$

$$c = C(p, \tilde{d}) - \frac{(C(p, \tilde{d}-1) - C(p, \tilde{d}+1))^2}{8(C(p, \tilde{d}+1) - 2C(p, \tilde{d}) + C(p, \tilde{d}-1))}$$

It is possible to estimate the correlation function of the matching costs in the range of [d~−1, d~+1] by calculating as described above. It is possible to obtain correlation functions for whole parallax candidate range [0, D] by sequentially executing this calculation in each parallax range. Then, by using the correlation function, the sub-pixelation of the cost map is completed by registering a value of the correlation function to the cost map in the unit of sub-pixels corresponding to a target parallax resolution s and by executing the abovementioned operation on each pixel of the first image. For instance, in a case where the parallax resolution s is desirable to be 0.2 pixels, values of the correlation functions per each 0.2 pixel of parallax may be registered. At this time, a value inputted in advance, a value inputted from the input unit 109 in executing the parallax calculation or a value recorded in the auxiliary storage unit or the storage unit 111 of the apparatus body is used as the parallax resolution s. In performing a sequential correlation function estimation, it may be executed without overlap of the ranges as d~=1, 3, 5 and so on. It is also possible to calculate overlapping ranges as d~=1, 2, 3 and so on and to take average values of the two estimated correlation functions estimated for one parallax. Thus, the range may be set in any manner as long as it is possible to estimate the correlation functions for the whole parallax range to be sub-pixelated.

Note that an example of fitting the matching costs for the three parallaxes to the quadratic function has been described above. However, this method is for convenience to the end, and the correlation function may be a primary symmetric function or a non-symmetric function, and matching costs to be fitted need not be only three but may be more values. Still further, in a case where the generation of the synthesized cost by the SGM method is required only in a partial range of the parallax candidates, the part to be sub-pixelated may be only a part of partial parallax candidates in the cost map.

In the synthesized cost generating step in Step S22, the synthesized cost generating portion 107 generates the synthesized cost map by using the SGM method to the cost map in the unit of sub-pixels generated in the cost map sub-pixelation step in Step S41. At this time, values inputted in advance, values inputted from the input unit 109 in executing the parallax calculation or values recorded in the auxiliary storage unit or the storage unit 111 of the apparatus body are used as values of the penalty costs P1 and P2. However, because the cost map is sub-pixelated, a change of the matching costs to a certain parallax candidate and to a next parallax candidate is reduced more than the cost map in the unit of pixels. Accordingly, in order to obtain an error correction effect similar to that of the first exemplary embodiment, it is necessary to reduce the penalty costs P1 and P2 more than those of the first exemplary embodiment. Because a $d^{\wedge -th}$ parallax candidate in the cost map in the unit of sub-pixels may be expressed as sd^=d by using the parallax resolution s and the following equation 8 holds, the change of the matching cost between the certain parallax candidate and the next parallax candidate becomes s times. Therefore, the penalty costs P1 and P2 may be used by respectively multiplying by s times.

$$\frac{\partial C(p, d)}{\partial \hat{d}} = \frac{\partial C(p, d)}{\partial d} \frac{\partial d}{\partial \hat{d}} = s \frac{\partial C(p, d)}{\partial d} \qquad \text{Equation 8}$$

In the sub-pixel parallax generating step in Step S23, the sub-pixel parallax generating portion 108 calculates a parallax distribution further sub-pixelated for each reference area from the synthesized cost map in the unit of sub-pixels generated in the synthesized cost generating step in Step S22. At this time, three synthesized costs to a parallax $d_m$ by which the synthesized cost becomes least, parallaxes before and after that, i.e., parallaxes deviated from $d_m$ by the parallax resolution s of the cost map, are used as the synthesized costs fitted to the correlation function. This arrangement enables to calculate the parallax in the unit smaller than the parallax resolution s.

The present exemplary embodiment enables to calculate a parallax amount of the object imaged in the first and second images by performing the abovementioned processing. It is noted that the abovementioned processing is executed repeatedly on each of the first and second images in a case of using a moving image or consecutively photographed still images similarly as described above also in the present exemplary embodiment.

Here, advantages of the present exemplary embodiment will be described in detail with reference to FIGS. 12A through 12C. FIG. 12A illustrates an example of a cost map in the unit of sub-pixels generated in the cost map sub-pixelation step in Step S41. FIG. 12B illustrates an example of the cost map in the unit of sub-pixels generated in the synthesized cost generating step in Step S22. FIG. 12C illustrates an example the sub-pixel parallax generated in the sub-pixel parallax generating step in Step S23. According to the present exemplary embodiment, it is possible to generate the synthesized cost map and the sub-pixel parallax by which the parallax variation is smoothed even in a case where the base length is short and the parallax variation is one pixel or less similarly to the first exemplary embodiment.

In the first exemplary embodiment described above, the cost map is generated by performing the image search processing on the high resolution image. Due to that, the resolution enhancement is conducted in the pixel direction of the cost map, i.e., in the x- and y-directions or in the epi-polar line direction, and in the parallax direction. It is also necessary to perform a process of reducing the parallax distribution in the unit of sub-pixels generated for the high resolution image so as to become the same pixel number with the first image in the process of generating sub-pixel parallax. In contrary to that, the present exemplary embodiment needs only the process of sub-pixelating the cost map only in the parallax direction, so that a number of dimensions of the cost map in FIG. 12A and a number of dimension of the synthesized cost map in FIG. 12B may be small. The process of reducing the parallax amount distribution is not also required. Thereby, the present exemplary embodiment excels the first exemplary embodiment in terms of both time calculation amount and space calculation amount from the aspect of calculation amount and enables to calculate the parallax amount more quickly or more efficiently even by equivalent computer hardware. Or, there is a possibility that a parallax amount calculation performance equivalent to that of the first exemplary embodiment can be realized by using a slower or limited calculation resource.

The present disclosure can be realized also by processing of supplying a program that realizes one or more functions of the abovementioned exemplary embodiments to a system or an apparatus through a network or a storage medium and of reading and executing the program by one or more processors in the system or in a computer of the apparatus. The present disclosure can be also realized by a circuit, e.g., ASIC, that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-187167, filed Oct. 10, 2019, which is hereby incorporated by reference herein in its entirety.

What is claimed is:

1. An image processing method comprising:
a matching cost calculating process of calculating matching costs in a unit of sub-pixels having higher resolution than first and second images by using (1) an image of a reference area based on the first image in which a target object is imaged and (2) images of a plurality of comparison areas based on the second image in which the target object is imaged; and
a synthesized cost calculating process of calculating synthesized costs related to the reference area based on comparison results of values related to the plurality of matching costs calculated in the matching cost calculating process,
wherein the matching costs in the unit of sub-pixels are calculated based on a comparison of the reference area contained in a first high resolution image obtained by enhancing resolution of the first image with the plurality of comparison areas contained in a second high resolution image obtained by enhancing resolution of the second image in the matching cost calculating process, or
wherein the matching costs in the unit of sub-pixels are calculated based on matching costs in a unit of pixels calculated by comparing the reference area contained in the first image with the plurality of comparison areas contained in the second image in the matching cost calculating step, by using a correlation function between parallax amounts and the matching costs related to the reference area and estimated based on the matching costs in the unit of pixels calculated by comparing the reference area contained in the first image and the plurality of comparison areas contained in the second image.

2. The image processing method according to claim 1, further comprising a process of calculating a parallax amount of the target object imaged in the reference area based on the synthesized costs.

3. The image processing method according to claim 1, wherein, in a case where the correlation function is used, the correlation function is estimated by fitting a quadratic function of the parallax amounts to the calculated matching costs in the unit of sub-pixels in the matching cost calculating process.

4. An image processing method, comprising:
a matching cost calculating process of calculating matching costs in a unit of sub-pixels having higher resolution than first and second images by using (1) an image of a reference area based on the first image in which a target object is imaged and (2) images of a plurality of comparison areas based on the second image in which the target object is imaged; and a synthesized cost calculating process of calculating synthesized costs related to the reference area based on comparison results of values related to the plurality of matching costs calculated in the matching cost calculating process, wherein the synthesized costs are calculated by acting a penalty cost which corresponds to the size of the reference area in the synthesized cost calculating process.

5. A non-transitory computer-readable recording storage medium storing a control program for making a control unit execute each process of the image processing method according to claim 1.

6. A non-transitory computer-readable recording storage medium configured to store a control program for making a control unit execute each process of the image processing method according to claim 4.

7. An image processing apparatus comprising:

an image acquisition portion configured to acquire first and second images in which a target object is imaged;

a cost map generating portion configured to calculate matching costs in a unit of sub-pixels having higher resolution than the first and second images by using (1) an image of a reference area based on the first image and (2) images of a plurality of comparison areas based on the second image; and a synthesized cost calculating portion configured to calculate synthesized costs related to the reference area based on comparison results of values related to the plurality of matching costs calculated by the cost map generating portion, wherein the cost map generating portion calculates the matching costs in the unit of sub-pixels based on a comparison of the reference area contained in a first high resolution image obtained by enhancing resolution of the first image with the plurality of comparison areas contained in a second high resolution image obtained by enhancing resolution of the second image, or wherein the cost map generating portion calculates matching costs in the unit of sub-pixels based on matching costs in a unit of pixels calculated by comparing the reference area contained in the first image with the plurality of comparison areas contained in the second image, by using a correlation function between parallax amounts and the matching costs related to the reference area and estimated based on the calculated matching costs in the unit of pixels.

8. The image processing apparatus according to claim 7, further comprising a parallax amount generating portion configured to calculate a parallax amount of the target object imaged in the reference area based on the synthesized costs.

9. The image processing apparatus according to claim 7, wherein, in a case where the correlation function is used, the correlation function is estimated by fitting a quadratic function of the parallax amounts to the matching costs in the unit of sub-pixels.

10. An image processing apparatus comprising:

an image acquisition portion configured to acquire first and second images in which a target object is imaged;

a cost map generating portion configured to calculate matching costs in a unit of sub-pixels having higher resolution than the first and second images by using (1) an image of a reference area contained in the first image and (2) images of a plurality of comparison areas contained in the second image; and a synthesized cost calculating portion configured to calculate synthesized costs related to the reference area based on comparison results of values related to the plurality of matching costs calculated by the cost map generating portion, wherein the synthesized cost generating portion calculates the synthesized cost by acting a penalty cost which corresponding to the size of the reference area.

11. The image processing apparatus according to claim 7, further comprising a user interface configured to receive a parameter from the user related to a parallax amount calculation unit of the matching costs in the unit of sub-pixels.

* * * * *